United States Patent [19]

Muehllehner

[11] 3,745,345

[45] July 10, 1973

[54] RADIATION IMAGING DEVICE
[75] Inventor: Gerd Muehllenhner, Mount Prospect, Ill.
[73] Assignee: Nuclear-Chicago Corporation, Des Plaines, Ill.
[22] Filed: Nov. 9, 1971
[21] Appl. No.: 196,891

[52] U.S. Cl............ 250/71.55, 250/71.5 R, 250/83 C
[51] Int. Cl............................................. G01j 39/18
[58] Field of Search...................... 250/83 C, 71.5 R, 250/71.5 S

[56] References Cited
UNITED STATES PATENTS
| | | | |
|---|---|---|---|
| 3,591,806 | 7/1971 | Brill | 250/71.55 |
| 3,519,821 | 7/1970 | Bolster | 250/83 C |
| 3,585,387 | 6/1971 | Bramlet | 250/71.5 |
| 3,011,057 | 11/1961 | Anger | 250/71.55 |

OTHER PUBLICATIONS

"Quantitative Analysis" by Myers et al., Nucleonics, February 1966 pages 58–61.

Primary Examiner—James W. Lawrence
Assistant Examiner—Harold A. Dixon
Attorney—Lowell C. Bergstedt et al.

[57] ABSTRACT

An Anger-type camera having a photomultiplier tube array mounted on a glass cover of crystal assembly to be about one-half inch from a top surface of the scintillation crystal. Non-linear spatial response is measured at points on crystal defining an array to determine correction factors at measurement points. Correction factors are stored and employed to correct output signals from the camera either on a one-event-at-a-time basis or after an uncorrected map has been stored in core memory in a digital data system.

5 Claims, 9 Drawing Figures

Patented July 10, 1973     3,745,345

RADIATION IMAGING DEVICE

Many improvements have been made in Anger-type scintillation cameras (U. S. Pat. No. 3,011,057) over the past few years. The most important of these improvements have been in the area of increasing the spatial resolving ability of the camera, thereby enhancing its diagnostic utility. One important step forward in spatial resolution improvement was made possible in 1968 by the availability of photomultiplier tubes having bialkali photocathodes with higher quantum efficiency. Another significant improvement in spatial resolution was attained through the use of non-linear preamplifiers as disclosed in a copending application by Kulberg and Muehllehner, Ser. No. 79,861, filed Oct. 12, 1970. However, these and other improvements in resolution have begun to accentuate an inherent characteristic of the Anger-type camera, i.e., spatial non-linearities in converting scintillations into position coordinate electrical signals.

It is the principal object of this invention to provide an improved radiation imaging device in which inherent spatial non-linearities in converting scintillations into position coordinate electrical signals are compensated for in accordance with predetermined measured values of non-linearity.

The features and advantages of this invention will be apparent from a consideration of the following detailed description in conjunction with the accompanying drawings in which.

Figure 1:
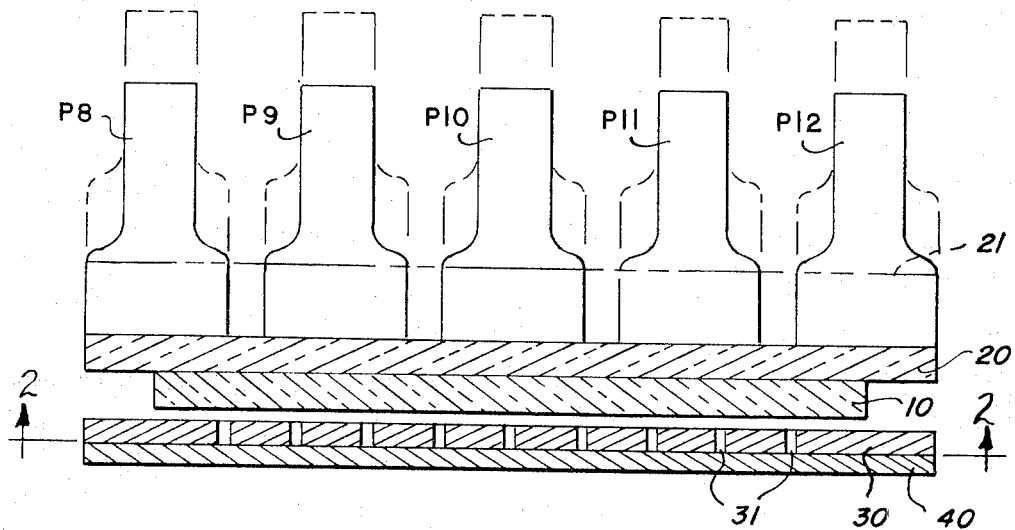
FIG. 1 illustrates from an elevational view the main components of a detector head of a scintillation camera in accordance with this invention and in accordance with prior art together with exemplary apparatus for use in measuring the non-linearity of the camera system.
Figure 2:
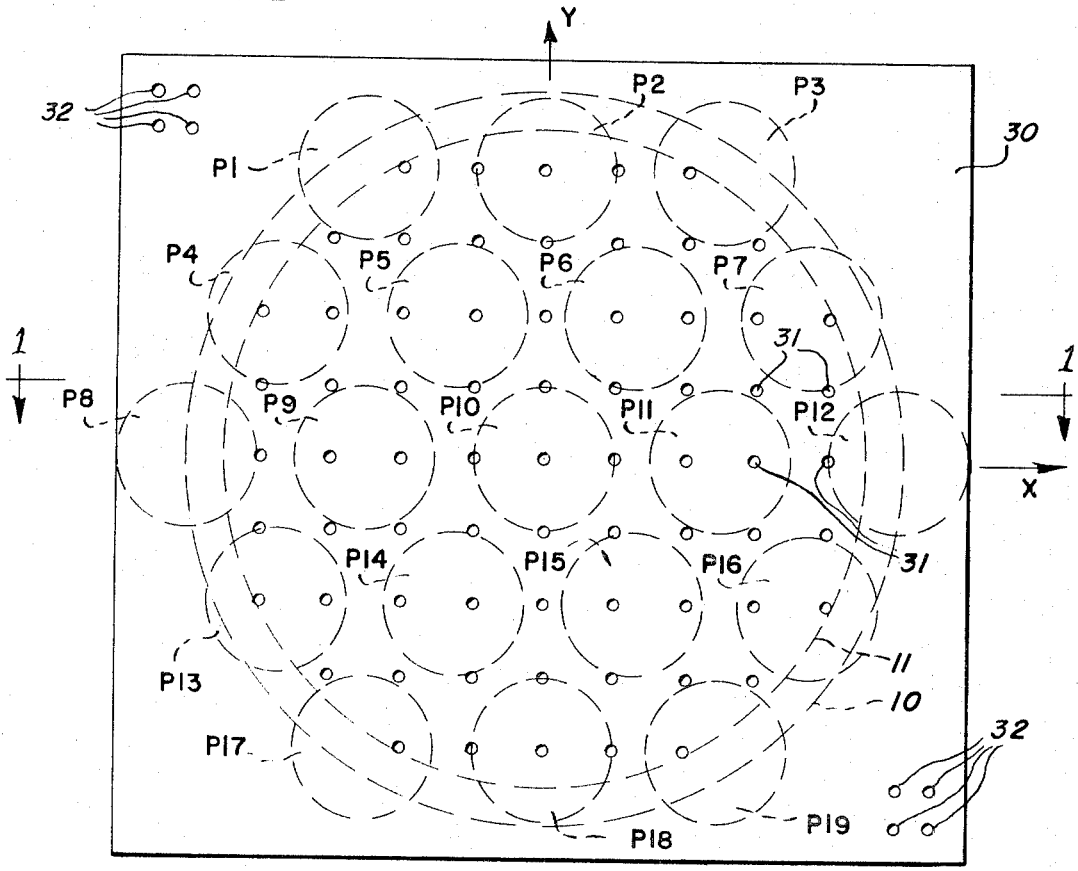
FIG. 2 is a view of the components in FIGS. 1 taken along the lines 2—2 in FIG. 1.

In FIG. 1, a prior art embodiment of the main detector head components of an Anger-type scintillation camera are shown as a scintillation crystal 10 in the form of a round disc of thallium-activated sodium iodide, a glass cover 20, a light pipe 21, and a nineteen tube array of photomultiplier tubes (tubes P8-P11 are representative of the nineteen tubes P1-P19 shown in FIG. 2).

Crystal 10 and glass cover 20 typically are mounted in an aluminum can and hermetically sealed. These assemblies are available commercially from several domestic and foreign suppliers and are usually about 13 inches in diameter with each of the crystal and glass cover being about one-half inch thick. Light pipe 21 is usually about an inch thick so that the photocathodes of photomultiplier tubes P1-P19 are spaced about one and one-half inches from a top surface of crystal 10. Commercially available scintillation cameras employing this prior art construction provides satisfactory results even though the effects of inherent non-linearity of the Anger-type camera system are discernable.

Figure 8:
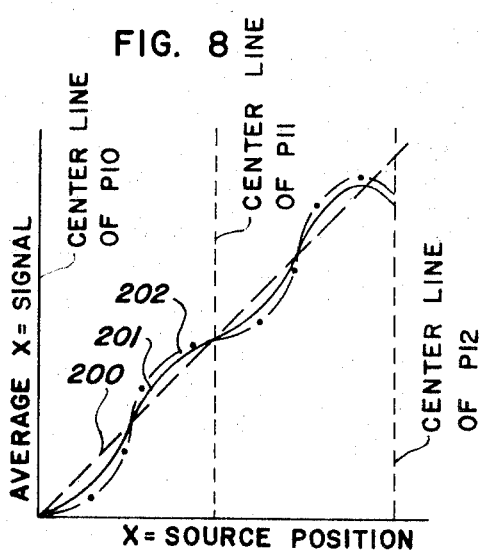
FIG. 8 is a graph useful in explaining this invention.
Figure 9:
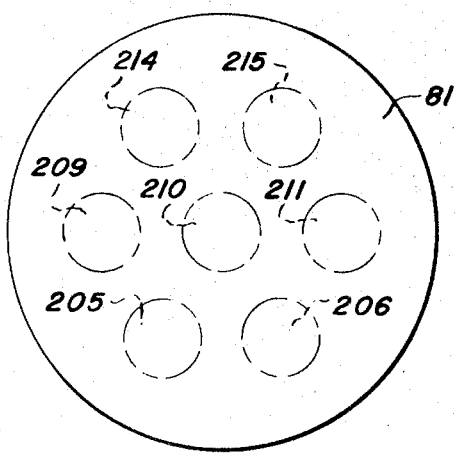
FIG. 9 is a pictorial representation useful in explaining this invention.

In FIGS. 8 and 9 the effects of inherent non-linearity of an Anger-type camera system are illustrated. The graph of FIG. 8 is obtained by moving a highly collimated gamma ray source along an x-axis of the camera system from the center of the crystal to the edge and recording the average x-signal magnitude in response to gamma rays striking the crystal. Curve 200 represents a theoretic linear response. Curve 201 represents a response of an Anger-type camera system having a particular degree of non-linearity, and curve 202 represents a response of an Anger-type camera system having a higher degree of non-linear response. It can be seen that, in general, the slope of curves 201 and 202 is less than the theoretic linear response in regions near the center lines of tubes P10 and P11 and is greater than the linear response in regions between tubes P10 and P11 and tubes P11 and P12. This demonstrates that the system tends to displace the display of scintillation events toward the center lines of photomultiplier tubes. This effect produces a display of "hot spots" or greater concentrations of displayed events in areas corresponding to central axes of photomultiplier tubes when a crystal is uniformly flooded with gamma rays, the seven central "hot spots" being depicted in FIG. 9. In other words, the concentrations of displayed events is greater within the seven circular regions 205, 206, 209, 210, 211, 214 and 215 than in the other regions of the display. As the non-linearity of the system increases, the "hot spots" become brighter because the displayed events are concentrated to a greater extent near points corresponding to the center lines of the photomultiplier tubes.

In accordance with a preferred embodiment of this invention, as shown in FIG. 1, light pipe 21 is eliminated, and photomultiplier tubes P1-P19 are mounted directly on glass cover 20. Thus the photocathodes are spaced about one-half inch from a top surface of crystal 10. (It should be understood that this invention is not limited to a particular spacing between photocathodes and crystal.) This construction produces an Anger-type camera system with improved resolution but, without the improved output signal processing also forming a part of a preferred embodiment, a higher degree of non-linear response. However, in accordance with this invention, non-linear response of a camera system is compensated for by correcting the output of the system in accordance with measured and stored values of non-linear response. It should be apparent that this invention can be employed in any gamma ray camera system which has inherent non-linear spatial response characteristics, but is especially advantageously employed in an Anger-type camera system in which the arranging of the photomultiplier tubes closer to the crystal increases both the resolution of the system and the magnitude of the inherent non-linearity thereof.

Various approaches to compensating for non-linear response of a camera system may be described in conjunction with FIGS. 1-7. Common to all of these approaches is a preferred approach to measuring non-linear response of a system illustrated generally in FIGS. 1 and 2. An apertured lead plate 30 is placed adjacent crystal 10 and a sheet source 40 of gamma ray emitting radioactive material is placed adjacent apertured plate 30. Apertures 31 in apertured plate 30 define a precise regular array of measurement points, and gamma rays passing through apertures 31 produce scintillations in crystal 10 at a regular array of spots. The output response of the camera system to this array of spots will be a corresponding array of displayed spots in which spots are, in general, displaced from "true positions," i.e., positions they would occupy in a linear system. The magnitude of the displacement of displayed spots from true positions may be measured for each point in the regular array. In practice apertures 31 are confined to a region within dashed circle 11, FIG. 2, which represents the useful area of crystal 10, which is about 10 inches in a typical camera system. An aperture diameter of 3 mm with a center-to-center spacing of 24 mm results in about 120 apertures in a 10 inch diameter region. Four exposures with aperture plate 31 shifted one-half the center-to-center distance between exposures using alignment apertures 32 in each corner will give almost 500 measurement points. For each measurement point a pair of coordinate correction factors is computed and stored. From this set of correction factors a pair of coordinate correction factors for points intermediate actual measurement points may be determined by interpolation. Thus a set of pairs of coordinate correction factors as large as necessary or desired can be obtained by this method. In accordance with this invention, a set of coordinate correction factors is used in one of various approaches to correct the output of an Anger-type camera system to compensate for inherent non-linearities.

Figure 5:
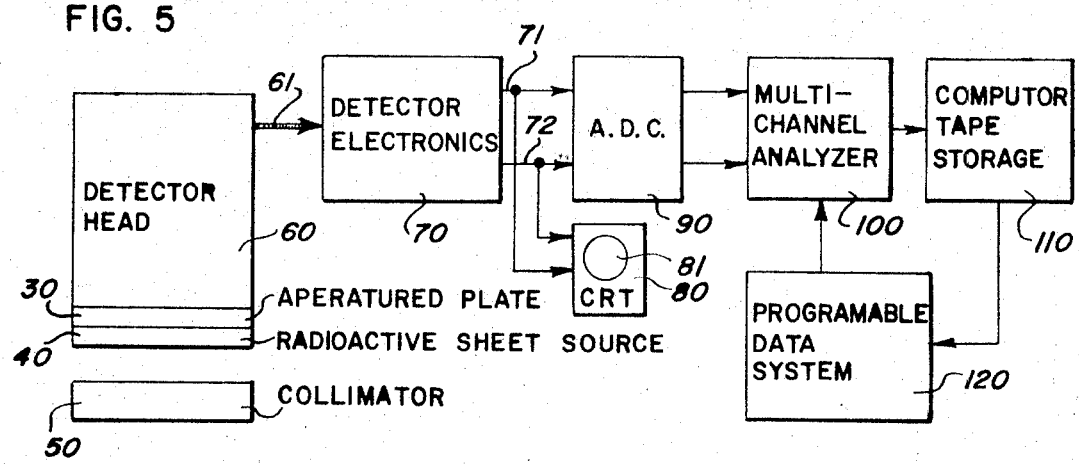
FIG. 5 is a block diagram of one embodiment of a scintillation camera system for implementing this invention.

FIG. 5 shows an Anger-type camera system in which an uncorrected digital image is first obtained and then corrected in accordance with a stored set of coordinate correction factors. A preferred approach to calculating and storing a set of coordinate correction factors may also be described in conjunction with the system shown in FIG. 5. The system shown in FIG. 5 comprises a detector head 60, detector electronics 70, a cathode ray tube (CRT) display 80 an analog-to-digital converter (ADC) 90, a multichannel analyzer 100 (including a visual display device), a computer tape storage device 110, and a programable data system 120.

In a preferred form of this invention, detector head 60 is an Anger-type detector head modified as shown in FIG. 1 and described above. Typically four output signals designated $x+$, $x-$, $y+$, and $y-$ are coupled by cable 61 to detector electronics 70 which produces output signals designated $x$, $y$ on output leads 71, 72. The $x$, $y$ signals may be displayed on CRT 80 or digitized in ADC 90 and stored in one of 4096 memory core locations in multichannel analyzer 100. The contents of memory core in analyzer 100 may be scanned and written onto magnetic tape in computer tape storage system 110 and fed into programable data system 120.

During four sequential exposures of detector head 60 to gamma rays from sheet source 40 through apertured plate 30 as described above, each exposure is stored in digital form in analyzer 100. The result is then written onto magnetic tape in tape storage unit 110 and then fed to data system 120 which has been programmed to compute and store a pair of coordinate correction factors for each measurement point. One way of accomplishing the computation of coordinate correction factors is to program the computer to find the location of the center of each measuring point in the final stored image and then compare that location to the location such measuring point would occupy in a linear system. The $x$ and $y$ displacements of the actual location and the true location can be considered to be the pair of coordinate correction factors associated with that measurement point. This calculation is done for each measurement point and the resultant coordinate correction factors are stored in core memory. Interpolation between measurement points can be used to produce a set of coordinate correction factors for each active memory core location in the 64 by 64 array. This interpolation can be accomplished at the time the correction factors for measurement points are determined or at a later time when an actual study performed by the camera system is being operated on.

Figure 3:
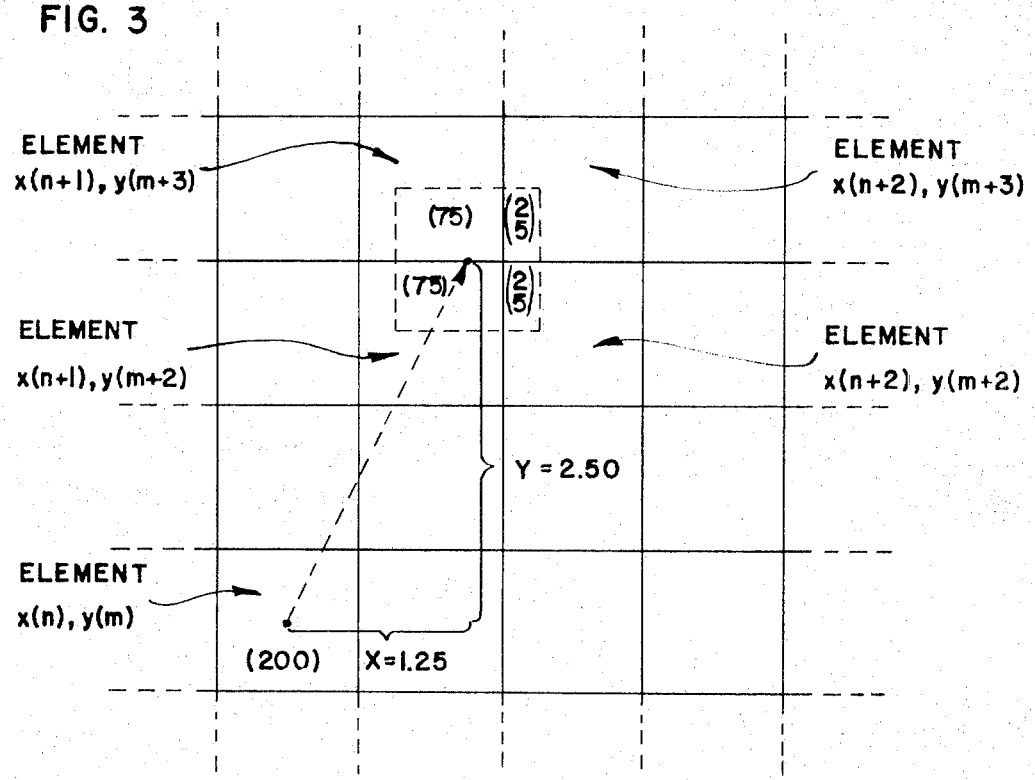
FIG. 3 is an illustration useful in explaining one mode of operation of this invention.
Figure 4:
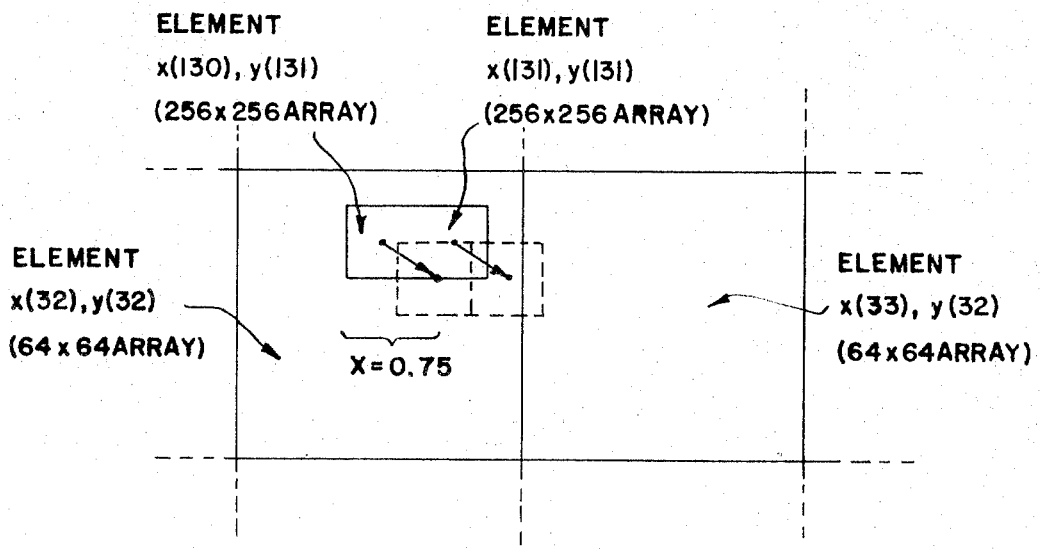
FIG. 4 is another illustration useful in explaining another mode of operation of this invention.

Correction of an actual study performed by the camera on a radioactive object viewed through collimator 50 is accomplished after correction factors have been determined using sheet source 40 and apertured plate 30. An uncorrected digital image or map is accumulated in analyzer 100 as numbers of counts in memory core locations and then written onto tape in tape storage unit 110. Programable data systems 120 takes the count information from tape storage unit 110 and redistributes the counts corresponding to each memory core location into new memory core locations in analyzer 100 in accordance with a predetermined pair of coordinate correction factors associated with each memory core location of the uncorrected map. For example, as shown in FIG. 3, element $x(n)$, $y(m)$ in the uncorrected map has coordinate correction factors $x=1.25$ and $y=2.50$ and has 200 counts stored in that memory core location. The coordinate correction factors indicate that the proper location for element $x(n)$, $y(m)$ in a linear system would be the location shown in dashed lines which overlaps four elements. The data system thus redistributes the 200 counts according to the degree of overlap so that 75 counts are entered into each of elements $x(n+1)$, $y(m+3)$ and $x(n+1)$, $y(m+2)$ and 25 counts each in elements $x(n+2)$, $y(m+3)$ and $x(n+2)$, $y(m+2)$. Each element or memory core location in the original map would be operated on in a similar fashion to produce a corrected map in which counts have been spatially redistributed to correct for non-linearities in producing the original map. The corrected map can then be displayed on the display device (typically a CRT display) in the multichannel analyzer.

Figure 6:
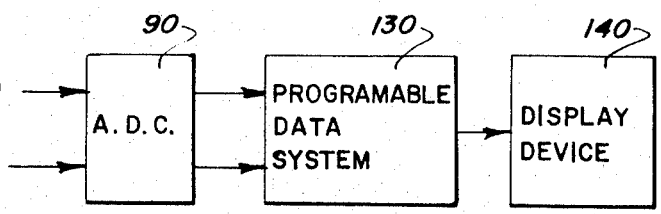
FIG. 6 is a block diagram of an alternate embodiment of a system for implementing this invention.

It will be apparent to those skilled in the art that the correction factor determination and the map correction functions could also be performed directly in a programable data system 130 as shown in the system in FIG. 6 provided it has sufficient core memory and/or peripheral devices to store a set correction factors, an uncorrected map and a corrected map. A peripheral display device such as a CRT display is coupled to data system 130 to enable a display of an uncorrected or a corrected map for purposes of visual inspection or photographing for record keeping purposes.

Figure 7:
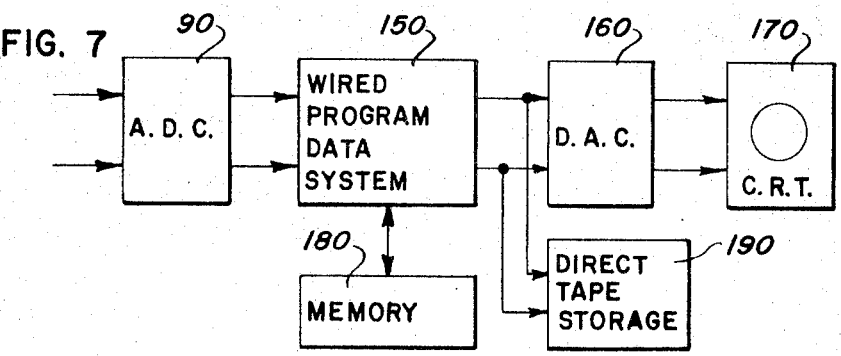
FIG. 7 is a block diagram of another alternate embodiment of a system for implementing this invention.

In FIG. 7 a system for employing premeasured coordinate correction factors to correct the coordinate signal output corresponding to each scintillation event is shown. A wired program data system 150 receives a pair of digitized coordinate signals from ADC 90 and corrects the digitized signals in accordance with coordinate correction factors stored in memory 180. The corrected digitized signals may be recorded on direct tape storage system 190 or in any other known data storage apparatus or passed through a digital-to-analog converter (ADC) 160 and displayed on CRT display 170. The operation for correcting each digitized pair of coordinate signals can be explained with reference to FIG. 4.

Each $x, y$ coordinate signal is digitized to an 8 bit word which would produce a 256 × 256 matrix array and is stored in a 10 bit register, with the word shifted 2 bits to the left (the same as multiplying by 4) for convenience of adding a 4 bit correction factor without using floating point arithmetic. Thus, for example, the digitized $x$-coordinate signal may be the following binary word after being shifted:

1000001000

This represents an element $x=130$ in a 256 × 256 array. A correction factor equal to 0.75 matrix elements after multiplication by 4 is represented in decimal form by the number "3" and in binary form as follows:

0000000011

Adding the correction factor to the $x$-coordinate gives the result:

1000001011

To allow for the overlap of the shifted element between elements in the original matrix, a random number is added to the corrected coordinate. This random number may take on four values between −0.5 and +0.5 matrix elements or, equivalently, between 0 and +1 matrix elements. Thus in the former case the possible random numbers in binary form are as follows:

−0000000010

−0000000001

+0000000001

+0000000010

Adding each of these to the corrected coordinate gives:

1000001001

1000001010

1000001100

1000001101

Thus, if these four possible results are each shifted 2 bits to the right, the corrected coordinate will be either $x=130$ or $x-131$ depending upon which random number value was added. Since the coordinate signals occur randomly in an Anger-type camera, the randomness can be satisfied by increasing the "random" number by 1 with each scintillation event. The final corrected coordinate may be shifted 2 bits to the right to maintain a 256 × 256 array; or if the corrected coordinate is to be stored as a count in a 64 by 64 array, the corrected coordinate may be shifted 4 bits to the right.

Adding different random numbers will in some instances produce resulting coordinates that alternate between adjacent elements in the 64 by 64 array as shown in the following example:

| | | |
|---|---|---|
| (1) | $x=131$ | 1000001100 |
| (2) | x correction factor =0.75 | 0000000011 |
| (3) | (1) + (2) | 1000001111 |
| (4) | random number = −0.25 | −0000000001 |
| (5) | (3) + (4) | 1000001110 |
| (6) | shift four bits to right x==in 64 by | |
| | 64 array | 100000 |
| (4') | random number = +0.50 | 0000000010 |
| (5') | (3) + (4') | 1000010001 |
| (6) | shift four bits, x=33 in 64 by 64 | 100001 |

The system shown in FIG. 7 is on-line with an Anger-type scintillation camera and can process events in either static or dynamic imaging situations. Of course, it will be appreciated that a programable data system could be employed instead of a wired program system, with the appropriate software programming of the programable system.

The above description of preferred and alternate embodiment of this invention is given by way of example only and it should be understood that numerous modifications could be made therein without departing from the scope of this invention as claimed in the following claims.

I claim:

1. In combination:

radiation imaging apparatus of the type which includes a radiation sensitive transducer and circuit means associated with said transducer for producing a pair of output electrical signals generally representing spatial coordinates of interaction of a quantum of radiation with said transducer, said apparatus having an inherent characteristic non-linear response such that a map of a uniform distribution of quanta of radiation interacting with said transducer produced by displaying a spot spatially located in accordance with said pair of electrical signals for each of said interacting quanta is distorted into a characteristic non-uniform distribution of spots;

means for irradiating said transducer at discrete points defining an array;

means for measuring and storing the magnitudes of said non-linear response at said discrete points; and means receiving said output electrical signals operative to product a map of a distribution of quanta of radiation from an object viewed by said apparatus corrected in accordance with said stored magnitudes of non-linear response.

2. The combination as claimed in claim 1, wherein said radiation sensitive transducer comprises a scintillation crystal in the form of a round disc having about one-half inch thickness; and said circuit means comprises a plurality of photomultiplier tubes mounted in an array with a photosensitive face of each tube spaced from a top surface of said disc by about one-half inch, and circuitry receiving outputs from said tubes operative to produce said pair of electrical signals;

whereby said radiation imaging apparatus is characterized by resolution improved from similar apparatus having a greater spacing between phototubes and crystal and the greater non-linear response of said circuit means is effectively reduced in said corrected map.

3. In combination:

radiation imaging apparatus of the type which includes a radiation sensitive transducer and circuit means associated with said transducer for producing a pair of output electrical signals generally representing spatial coordinates of interaction of a quantum of radiation with said transducer;

analog-to-digital conversion means for converting said pair of output electrical signals to a corresponding pair of binary digital words;

storage means for storing said pair of digital words as a registered count in a rectangular matrix of storage elements, a map of a spatial distribution of quanta of radiation interacting with said transducer being produced by accumulating counts in said matrix, said map being distorted from the actual distribution by non-linearities inherent in said radiation imaging apparatus;

correction factor storage means for storing pairs of coordinate correction factors associated with a regular array of points on said transducer; said coordinate correction factors being predetermined in accordance with measurements of the magnitude of non-linear response of said radiation imaging apparatus at said points;

matrix correction means for correcting said map stored in said storage means in accordance with said coordinate correction factors to produce a map more accurately representing the actual spatial distribution of said quanta of radiation interacting with said transducer.

4. The combination as claimed in claim 3, wherein said radiation sensitive transducer comprises a scintillation crystal in the form of a round disc having about one-half inch thickness; and said circuit means comprises a plurality of photomultiplier tubes mounted in an array with a photosensitive face of each tube spaced from a top surface of said disc by about one-half inch, and circuitry receiving outputs from said tubes operative to produce said pair of electrical signals;

whereby said radiation imaging apparatus is characterized by resolution improved from similar apparatus having a greater spacing between tubes and crystal and the greater non-linear response of said circuit means is effectively reduced in said corrected map.

5. In combination:

radiation imaging apparatus of the type which includes a radiation sensitive transducer and circuit means associated with said transducer for producing a pair of output electrical signals generally representing spatial coordinates of interaction of a quantum of radiation with said transducer;

correction factor storage means for storing pairs of coordinate correction factors associated with a regular array of points on said transducer; said coordinate correction factors being predetermined in accordance with measurements of the magnitude of non-linear response of said radiation imaging apparatus at said points;

analog-to-digital conversion means for converting said pair of output electrical signals to a corresponding pair of binary digital words;

correction means for producing a corrected version of said pair of binary digital words in accordance with an associated pair of coordinate correction factors; and accumulating means receiving corrected versions of pairs of binary digital words resulting from a spatial distribution of quanta of radiation interacting with said transducer operative to produce a map of said spatial distribution substantially undistorted by the non-linear response of said radiation imaging apparatus.

* * * * *